US008526492B2

(12) United States Patent
Schwarz et al.

(10) Patent No.: US 8,526,492 B2
(45) Date of Patent: Sep. 3, 2013

(54) ENCODING METHOD, DECODING METHOD, AND ENCODING APPARATUS FOR A DIGITAL PICTURE SEQUENCE

(75) Inventors: Heiko Schwarz, Berlin (DE); Tobias Hinz, Berlin (DE); Thomas Wiegand, Berlin (DE)

(73) Assignee: Thomson Licensing (FR)

( * ) Notice: Subject to any disclaimer, the term of this patent is extended or adjusted under 35 U.S.C. 154(b) by 1844 days.

(21) Appl. No.: 10/584,658

(22) PCT Filed: Nov. 4, 2004

(86) PCT No.: PCT/EP2004/012480
§ 371 (c)(1),
(2), (4) Date: May 9, 2007

(87) PCT Pub. No.: WO2005/069632
PCT Pub. Date: Jul. 28, 2005

(65) Prior Publication Data
US 2007/0274384 A1    Nov. 29, 2007

(30) Foreign Application Priority Data

Jan. 5, 2004    (EP) .................................... 04290022

(51) Int. Cl.
*H04N 7/12*    (2006.01)
*H04N 11/02*   (2006.01)
*H04N 11/04*   (2006.01)

(52) U.S. Cl.
USPC ................................ 375/240.02; 375/240.03

(58) Field of Classification Search
USPC ........................................ 375/240.02, 240.03
See application file for complete search history.

(56) References Cited

U.S. PATENT DOCUMENTS 5,835,149 A * 11/1998 Astle ......................... 375/240.05
6,366,704 B1 * 4/2002 Ribas-Corbera et al. ..... 382/239
(Continued)

FOREIGN PATENT DOCUMENTS

EP    1204279    5/2002
WO    WO 99/49664    9/1999

OTHER PUBLICATIONS

G. Cicalini et al: "Dynamic psychovisual bit allocation for improved quality bit rate in MPEG-2 transmission over ATM links", Electronics Letters, IEE Stevenage, GB, vol. 32, No. 4, Feb. 15, 1996, pp. 370-371.

(Continued)

*Primary Examiner* — David Czekaj
*Assistant Examiner* — Chikaodili E Anyikire
(74) *Attorney, Agent, or Firm* — Tutunjian & Bitetto, P.C.

(57) ABSTRACT

Rate control mechanisms for video encoding aim to provide the best possible video quality while keeping given conditions on transmission rate and decoding delay. In order to achieve a constant video quality, the anchor and non-anchor frames of different frame types are encoded using a different number of bits. However, since video sequences generally contain widely varying picture content and previously coded frames are used to predict a given frame, a suitable assignment of frame target bit rates is hard to determine, especially for non-anchor frames. According to the invention, non-anchor frames are coded using a fixed quantization parameter. Since the quantization parameter used for the encoding of non-anchor frames is directly derived from the average quantization parameter of the previously encoded anchor frame, such approach ensures a constant video quality. Beside of that, the complexity of the rate control strategy is reduced, because no macroblock-level rate control is applied for the encoding of non-anchor frames.

10 Claims, 1 Drawing Sheet

(56) References Cited

U.S. PATENT DOCUMENTS

| | | | |
|---|---|---|---|
| 6,434,196 B1* | 8/2002 | Sethuraman et al. | 375/240.12 |
| 6,690,833 B1* | 2/2004 | Chiang et al. | 382/236 |
| 7,092,441 B1* | 8/2006 | Hui et al. | 375/240.03 |
| 2002/0064228 A1* | 5/2002 | Sethuraman et al. | 375/240.12 |
| 2002/0163966 A1* | 11/2002 | Ramaswamy | 375/240.03 |
| 2003/0031128 A1* | 2/2003 | Kim et al. | 370/229 |
| 2003/0053538 A1* | 3/2003 | Katsavounidis et al. | 375/240.01 |
| 2003/0072364 A1* | 4/2003 | Kim et al. | 375/240.03 |
| 2007/0253485 A1* | 11/2007 | Ogawa et al. | 375/240.13 |

OTHER PUBLICATIONS

Mitchell Pennebakker Fogg Legall Ed—Mitchell J.L et al Mitchell J. L. et al: "MPEG video compression standard", MPEG Video Compression Standard, Chapman and Hall Digital Multimedia Standards Series, New York, 1996, pp. 135-165.
Search Report Dated Dec. 16, 2004.

* cited by examiner

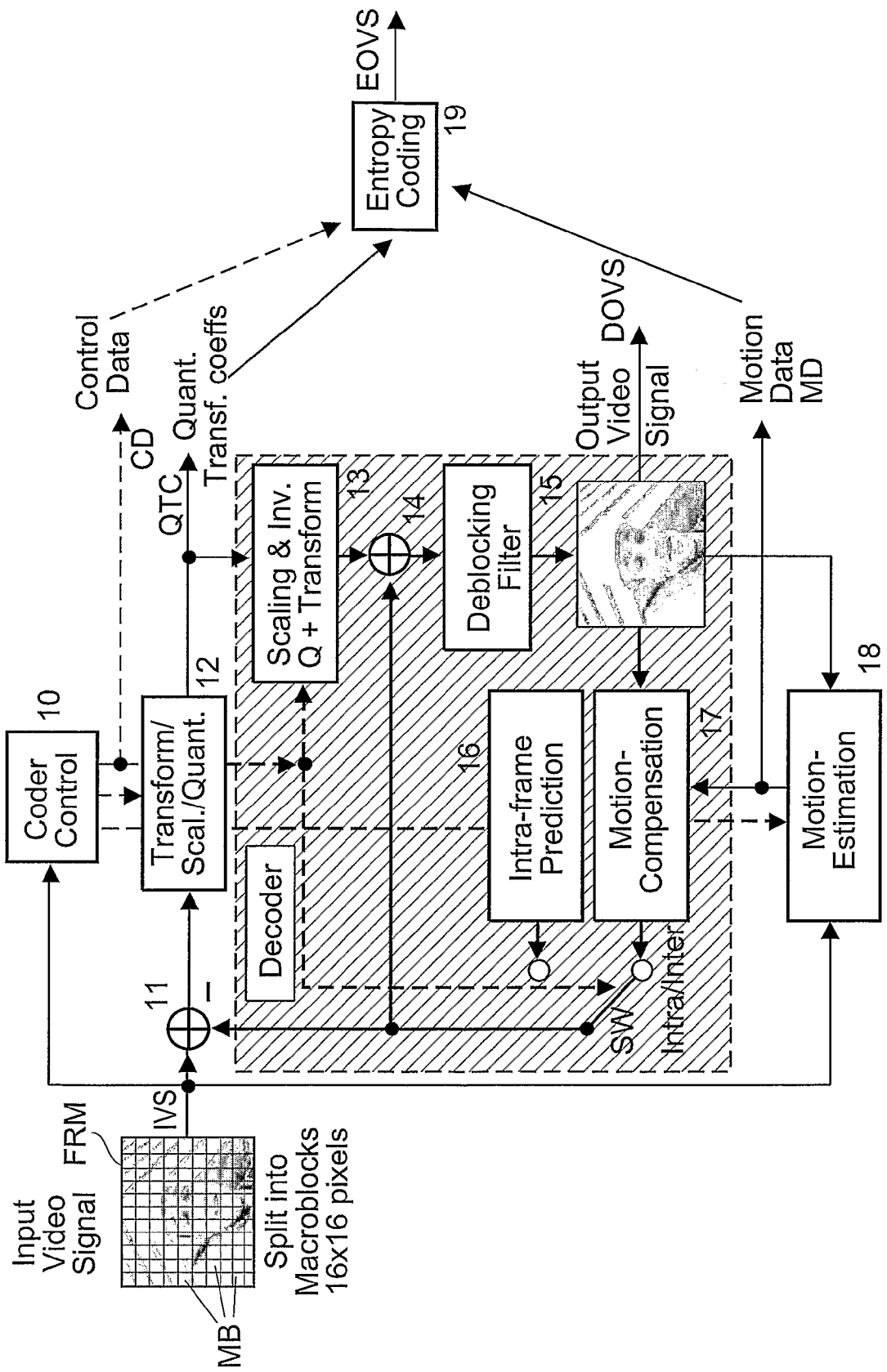

ENCODING METHOD, DECODING METHOD, AND ENCODING APPARATUS FOR A DIGITAL PICTURE SEQUENCE

This application claims the benefit, under 35 U.S.C. §365 of International Application PCT/EP04/012480, filed Nov. 4, 2004, which was published in accordance with PCT Article 21(2) on Jul. 28, 2005 in English and which claims the benefit of European patent application No. 04290022.5, filed Jan. 5, 2004.

The invention relates to an encoding method and a decoding method and to an encoding apparatus for a digital picture sequence, wherein the frames of said picture sequence are arranged in macroblocks containing pixel blocks and the frames are encoded using B, P and I coding types.

BACKGROUND

Video sequences generally contain widely varying picture content and previously coded frames are used to predict a current frame. In block-based hybrid video coders such as ITU-T and ISO/IEC JTC1, "Generic coding of moving pictures and associated audio information—Part 2: Video", ITU-T Recommendation H.262—ISO/IEC 13818-2 (MPEG-2 Visual), November 1994,
ITU-T, "Video coding for low bitrate communication," ITU-T Recommendation H.263, version 1, November 1995, version 2, January 1998,
ISO/IEC JTC1, "Coding of audio-visual objects—Part 2: Visual," ISO/IEC 14496-2 (MPEG-4 Visual version 1), April 1999, Amendment 1 (version 2), February 2000,
T. Wiegand (ed.), "Joint Final Committee Draft (JFCD) of Joint Video Specification (ITU-T Rec. H.264 | ISO/IEC 14496-10 AVC)", Joint Video Team (JVT) of ISO/IEC MPEG and ITU-T VCEG, JVT-D157, July 2002,
the distortion of a macroblock as well as the number of bits required for encoding it is mainly controlled by the macroblock's quantisation parameter. The general objective of a rate control mechanism is to provide the best possible video quality while keeping given conditions on transmission rate and decoding delay. Typically, a rate control includes a frame-layer control and a macroblock-layer control. In order to achieve a constant video quality, the anchor frames and the non-anchor frames of different coding types (I (intra-coded), P (predictive coded) and B (bi-directionally-predictive coded)) must be encoded using a different number of bits for each coding type. E.g. in MPEG-2 Visual, the code for an encoder input frame that is to be encoded as P type, which frame is at encoder input preceded by a frame that is to be encoded as B type, is output by the encoder before the code for the B frame is output because the P frame must be reconstructed in the decoder before the B frame can be reconstructed based on the reconstructed P frame. While the frame-layer control assigns a target number of bits for a frame so that the conditions on transmission rate and decoding delay are kept, the macroblock-layer control selects the macroblock quantisation parameters in a way that this target is achieved.

A widely used method for setting the target number of bits when coding different frame types is the frame-layer rate control as specified in Test Model 5 (ISO/IEC JTC1/SC29/WG11/N0400, "Test Model 5, Draft Revision 2", April 1993). This document describes an encoder strategy for MPEG-2 Visual. The assignment of frame targets is based on so-called global complexity measures. For each frame type (I, P, B) there exists a specific complexity measure, which is updated after the encoding of each frame of the respective frame type. The target number of bits for each frame is determined by weighting the number of available bits for (the remaining frames of) a group of pictures using these global complexity measures.

INVENTION

However, this concept has a general disadvantage in that a reasonable distribution (with the objective of constant subjective video quality) of the available bit budget to different frame types is not feasible since the decision is based on measurements for a different interval of time. In particular, the frame targets for bi-directionally coded frames (or, more general, non-anchor frames) are difficult to determine, and if applied to more recent video coding standards like H.263 (with Annex O), MPEG-4 Visual or H.264/AVC, the problem arises that the macroblock-layer rate control for non-anchor frames becomes ineffective especially at low bit-rates, because a large fraction of the macroblocks is coded without transform coefficients and thus the macro-block quantisation parameters cannot reasonably be adjusted.

In applications requiring a very low decoding delay the coding order of frames should be the same as the display order, hence 'classical' B frames as defined in MPEG-2 Visual, H.263 (with Annex O), or MPEG-4 Visual cannot be used. In JVT/H.264 the concept of bi-directional B pictures is generalised to bi-predictive B pictures, but 'classical' bi-directional pictures are still supported. For such class of very low-delay applications, the global rate control algorithm must assign a nearly constant target number of bits to each frame.

In applications which do not require a very low decoding de-lay, the main objective of the frame-layer rate control is to assign the frame bit number targets versus the different frame or picture types in such a way that a constant subjective video quality level is kept over the different frame or picture types. In real-time applications that do not allow a complex analysis or a pre-coding of several frames, this decision is to be made on the basis of previously coded frames. However, due to the widely varying picture content of video sequences, decisions based on a different interval of time are often unsuitable, and due to the fact that one or more previously coded pictures are used for predicting a given picture, there is no simple model that can be used for determining the related optimum target number of bits for different frame types. Especially if non-anchor frames are used, a reasonable distribution of the bit budget among the different frame types cannot suitably be estimated.

A problem to be solved by the invention is to provide an improved bit rate control such that a constant subjective video coding or decoding quality over different frame or picture types is achieved. This problem is solved by the en-coding method disclosed in claim 1 and by the decoding method disclosed in claim 10. An apparatus that utilises this encoding method is disclosed in claim 2.

The invention concerns frame-layer rate control for applications in which the delay constraint is relaxed so that the frames of a video sequence need not be encoded in the display order that is output at decoder side, and wherein the target number of bits for a group containing one anchor frame and several non-anchor frames (e.g. 'B . . . BP' in the classical B-frame case) is not required to be constant.

According to the invention, the problem of assigning before encoding a target number of bits to frames of each type is circumvented. Instead, non-anchor frames are encoded using a fixed quantisation parameter, and no macroblock-layer rate control is used. The quantisation parameter used for the encoding of non-anchor frames or a single non-anchor frame in a current group of frames is directly derived from the aver-age quantisation parameter of the previously encoded anchor frame belonging to that group (which anchor frame will follow that non-anchor frames in display order at decoder side). Thereby, advantageously, a nearly constant (objective) video quality can be ensured. The distribution of the bit budget among different frame types can be controlled by setting suitable target rates for the anchor frames only.

A high-level global rate control must only assign a target number of bits to the above-mentioned frame or picture groups consisting of a single anchor frame (picture) and several non-anchor frames (pictures) which follow that anchor frame (picture) in coding order and precede it in display order, e.g. 'B...BI' and 'B...BP' in the classical B frame case. This kind of bit distribution can be controlled significantly easier than the known separate bit distribution among frames including all coding types I, P, and B. In other words, non-anchor frames are coded using a fixed quantisation parameter. Since the quantisation parameter used for the encoding of non-anchor frames is directly de-rived from the average quantisation parameter of the previously encoded anchor frame, such approach ensures a constant video quality. Beside of that, the complexity of the rate control strategy is reduced, because no macroblock-level rate control is applied for the encoding of non-anchor frames.

In principle, the inventive encoding method is related to digitally encoding a picture sequence, wherein the frames of said picture sequence are arranged in macroblocks containing pixel blocks and the frames are encoded in bi-directionally-predictive and predictive and/or intra coding types denoted B, P and I, respectively, and wherein adaptively, for the purpose of overall bit rate control, a specific frame target number of bits is assigned to each one of these coding types, and wherein said overall bit rate control includes a frame-layer rate control and a macroblock-layer rate control which macroblock-layer rate control selects macroblock quantisation parameters, said method including the steps:

assigning a target number of bits to anchor frames only, or to each group of frames consisting of a single anchor frame and at least one non-anchor frame;

coding anchor frames using macroblock-layer rate control by adaptive macroblock quantisation parameters, and coding non-anchor frames without macroblock-layer rate control by using fixed macroblock quantisation parameters.

In principle the inventive encoding apparatus is suited for digitally encoding a picture sequence, wherein the frames of said picture sequence are arranged in macroblocks containing pixel blocks and the frames are encoded in bi-directionally-predictive and predictive and/or intra coding types denoted B, P and I, respectively, and wherein adaptively, for the purpose of overall bit rate control, a specific frame target number of bits is assigned to each one of these coding types, and wherein said overall bit rate control includes a frame-layer rate control and a macroblock-layer rate control which macroblock-layer rate control selects macroblock quantisation parameters, said apparatus including:

means for assigning a target number of bits to anchor frames only, or to each group of frames consisting of a single anchor frame and at least one non-anchor frame;

means for coding anchor frames using macroblock-layer rate control by adaptive macroblock quantisation parameters, and for coding non-anchor frames without macroblock-layer rate control by using fixed macroblock quantisation parameters.

In principle, the inventive decoding method is related to digitally decoding an encoded picture sequence, wherein the frames of said picture sequence are arranged in macroblocks containing pixel blocks and the frames were encoded in bi-directionally-predictive and predictive and/or intra coding types denoted B, P and I, respectively, and wherein adaptively, for the purpose of overall bit rate control, a specific frame target number of bits was assigned to each one of these coding types, and wherein said overall bit rate control included a frame-layer rate control and a macro-block-layer rate control which macroblock-layer rate control had selected macroblock quantisation parameters, wherein a target number of bits was assigned to anchor frames only, or to each group of frames consisting of a single anchor frame and at least one non-anchor frame, and wherein anchor frames were coded using macroblock-layer rate control by adaptive macroblock quantisation parameters, and non-anchor frames were coded without macro-block-layer rate control by using fixed macroblock quantisation parameters, said method including the step of:

decoding said anchor frames using correspondingly adaptive macroblock quantisation parameters, and decoding said non-anchor frames using fixed macroblock quantisation parameters.

Advantageous additional embodiments of the invention are disclosed in the respective dependent claims.

DRAWING

Exemplary embodiments of the invention are described with reference to the accompanying drawing, which show in:

FIG. 1 Block diagram of an inventive encoder, including the inventive coder control by a corresponding control stage.

EXEMPLARY EMBODIMENTS

In FIG. 1 an input video signal IVS is fed to a subtractor 11, to a first input of a motion estimation stage 18 and to a coder controller 10. The coding is based on frames FRM which are split or partitioned into macroblocks MB each containing e.g. 16*16 luminance pixels arranged in e.g. 4 luminance pixel blocks, and corresponding chrominance pixel blocks. The output of subtractor 11 passes through a transform, scaling and quantisation stage 12 and a scaling, (corresponding) inverse quantisation and (corresponding) inverse transformation stage 13 to an adder 14. Said transform is preferably a DCT transform on pixel blocks. The quantised transform coefficients QTC coming from stage 12 are also fed to an entropy encoding stage 19. The output of adder 14 passes via an optional de-blocking filter 15 to a (macroblock-based) motion compensation stage 17 and to a second in-put of (macroblock-based) motion estimation stage 18, thereby providing a decoded output video signal DOVS. Motion compensation stage 17 receives the required motion data MD, e.g. (macroblock-based) motion vectors, from stage 18. Stage 17 and/or stage 18 contain at least one picture memory. Either the output of motion compensation stage 17 or the out-put of an intra-frame prediction stage 16 is fed via a switch SW to the subtracting input of subtractor 11 and to a second input of adder 14. Coder controller 10 controls stages 12, 13, 16, 17, 18 and switch SW. Corresponding control data CD and the motion data MD output from stage 18 are also fed to entropy encoding stage 19 in which the data are entropy encoded, including e.g. VLC (variable length encoding) and side information multiplexing and possibly error protection, leading to an encoded output video signal EOVS to be transmitted or transferred. Stages 13 to 17 together represent a decoder, i.e. the encoder includes a decoder operation.

A high-level global rate control processing assigns, using coder controller 10, a number of target bits $\hat{R}_{Group-BP}$ (or $\hat{R}_{Group-I}$) for each group of frames that consists of an anchor frame coded as P frame (in H.264 also B frame) or I frame and several non-anchor frames, e.g. a 'B ... BP' or 'B ... BI' group for the classical B frame case, whereby such group may also include one B frame only instead of several B frames. The high-level global rate control must take care that $\hat{R}_{Group-BP}$ or $\hat{R}_{Group-I}$ are set such that a nearly constant video quality is achieved in the encoded output video signal EOVS and in the correspondingly decoded video signal in a decoder, respectively. This can be achieved by controlling the image quality (e.g. in terms of the mean squared error) or the average quantisation parameter of already coded anchor frames.

The inventive rate control for the anchor and non-anchor frames inside a group of one anchor and several non-anchor frames uses two weighting factors, $f_{Group-BP}$ and $f_{Group-I}$, which are adaptively controlled during the encoding of a video sequence. These factors $f_{Group-BP}$ and $f_{Group-I}$ specify the estimated ratios of the number of bits used (denoted $R_{NA}$) for encoding a non-anchor frame to the number $R_{A-BP}$ of bits required for encoding an anchor frame if it is coded as P/B-frames, or $R_{A-I}$ if it is coded as I-frame:

$$f_{Group-BP} = \frac{R_{NA}}{R_{A-BP}}, f_{Group-I} = \frac{R_{NA}}{R_{A-I}}.$$

DEFINITIONS

A current frame is called an 'anchor frame' if all frames that were previously encoded before this current frame precede it in display order.

A current frame is called a 'non-anchor frame' if there exists at least one previously encoded frame that follows the current frame in display order.

Initialisation

For initialisation, at the beginning of a sequence the factors $f_{Group-BP}$ and $f_{Group-I}$ are set, e.g. by controller 10, to predefined values, e.g.

$$f_{Group-BP} = \frac{1}{2}, f_{Group-I} = \frac{1}{10}.$$

Determining the Target Rate Anchor Frames

Given the number of target bits $\hat{R}_{Group-BP}$ (or $\hat{R}_{Group-I}$) for a group of an anchor and several non-anchor frames, these factors are used in controller 10 for assigning the frame target $\hat{R}_{A-BP}$ (or $\hat{R}_{A-I}$) for the anchor frame coded as P/B-frame (or I-frame) inside the group:

Anchor frame is coded as P/B-frame:

$$\hat{R}_{A-BP} = \frac{\hat{R}_{Group-BP}}{(1 + N_{NA} \cdot f_{Group-BP})},$$

Anchor frame is coded as I-frame:

$$\hat{R}_{A-I} = \frac{\hat{R}_{Group-I}}{(1 + N_{NA} \cdot f_{Group-I})}.$$

$N_{NA}$ (with $N_{NA} \geq 0$) denotes the number of non-anchor frames inside the regarded group of frames. The corresponding anchor frame is encoded using an accurate macroblock-layer rate-control with the target rate of $\hat{R}_{A-BP}$ (or $\hat{R}_{A-I}$) respectively.

If the anchor frame is coded as a pair of field pictures, the local rate-control will distribute the frame target rate among the two field pictures.

Encoding Non-Anchor Frames

The non-anchor frames of a group of an anchor frame and several-non-anchor frames are encoded using a fixed quantisation step size of $Q_{NA} \approx 1.2 \cdot \overline{Q_A}$, where $\overline{Q_A}$ denotes the average quantisation step size that was used for encoding the anchor frame of the corresponding group of one anchor and several non-anchor frames. This leads to the following relationships for the quantisation parameters QP:

MPEG-2, H.263, MPEG-4: $QP_{NA} = \max(\text{round}(1.2 \cdot \overline{QP_A}), QP_{max})$, JVT/H.264: $QP_{NA} = \max(\text{round}(2 + \overline{QP_A}), QP_{max})$ where $QP_{max}$ denotes the maximum quantisation parameter that is supported by the syntax. Note that the non-anchor frames are transmitted after the corresponding anchor frame, although they are displayed first.

Model Update After Encoding

After a group of an anchor frame and several non-anchor frames has been encoded completely, the weighting factors $f_{Group-BP}$ and $f_{Group-I}$ are updated in controller 10 if the number of encoded non-anchor pictures is greater than zero. First, a weighting factor for the just encoded group (with continuously increasing index $n_{Group-BP}$ or $n_{Group-I}$) is determined by Anchor frame is P/B-frame:

$$\tilde{f}_{Group-BP}(n_{Group-BP}) = \frac{1}{N_{NA} \cdot R_{A-BP}} \cdot \sum_{k=1}^{N_{NA}} R_{NA}(k),$$

Anchor frame is I-frame:

$$\tilde{f}_{Group-I}(n_{Group-I}) = \frac{1}{N_{NA} \cdot R_{A-I}} \cdot \sum_{k=1}^{N_{NA}} R_{NA}(k),$$

with $R_{NA}(k)$ being the number of used bits for the k-th non-anchor frame inside the group, and $R_{A-BP}$ and $R_{A-I}$ being the number of bits used for encoding the anchor frames as P/B-frame and as I-frame, respectively.

The weighting factors, which will be used for determining the target fraction of the bit budget used for the anchor frame of following groups, are calculated in controller 10 as an average value for the last e.g. five encoded groups of one anchor frame and a non-zero number of non-anchor frames:

Anchor frame is P/B-frame:

$$f_{Group-BP} = f_{Group-BP}(n_{Group-BP})$$

$$= \frac{1}{\max(5, n_{Group-BP})} \cdot \sum_{i=\max(0, n_{Group-BP}-5)}^{n_{Group-BP}-1} \tilde{f}_{Group-BP}(i);$$

Anchor frame is I-frame:

$$f_{Group-I} = f_{Group-I}(n_{Group-I})$$
$$= \frac{1}{\max(5, n_{Group-I})} \cdot \sum_{i=\max(0, n_{Group-I}-5)}^{n_{Group-I}-1} \tilde{f}_{Group-I}(i).$$

The fundamental difference to other frame-layer rate control strategies is that the weighting factors $f_{Group-BP}$ and $f_{Group-I}$ are used only for estimating a reasonable target number of bits for the anchor frame inside a group of one anchor and several non-anchor frames. The quality as well as the number of bits used for encoding the non-anchor frames is only determined by the average quantisation parameter QP of the corresponding anchor frame. Thus, a fairly constant video quality is achieved while the number of bits used for encoding non-anchor frames can vary.

Usage of a Single Weighting Factor

Especially if Intra frames are coded rarely, it is appropriate that both weighting factors $f_{Group-BP}$ and $f_{Group-I}$ are updated at the same time. This can be carried out by combining the inventive features with the above-mentioned high-level rate control, which sets the target rates $\hat{R}_{BP}$ and $\hat{R}_{BI}$ for the 'B . . . BP' and 'B . . . BI' groups of pictures. As an example, it is assumed that the high-level rate control assigns the target rates $\hat{R}_{Group-BP}$ and $\hat{R}_{Group-I}$ by using an adaptively controlled weighting factor $f_{BP-I}$, which specifies the estimated bit-rate ratio of anchor frames coded as P/B-frames and anchor frames coded as I-frames ($f_{BP-I}=R_{A-BP}/R_{A-I}$) suitable for constant-quality encoding. The target rates $\hat{R}_{Group-BP}$ and $\hat{R}_{Group-I}$ are set by exploiting $$\frac{\hat{R}_{Group-BP}}{1 + N_{NA} \cdot f_{Group-BP}} = \frac{\hat{R}_{Group-I}}{f_{BP-I} + N_{NA} \cdot f_{Group-BP}}.$$

This leads to the following relationship between the two weighting factors $f_{Group-BP}$ and $f_{Group-I}$:

$$f_{Group-I} = \frac{f_{Group-BP}}{f_{BP-I}}.$$

The correspondingly inverse steps are carried out in a corresponding decoding of the encoded picture sequence.

The invention claimed is:

1. Method for digitally encoding a picture sequence, wherein the pictures of said picture sequence are arranged in macroblocks containing pixel blocks and the pictures are encoded in intra and predictive and/or bi-predictive coding types denoted I, P and B, respectively, and wherein said pictures form groups of pictures and each group includes one anchor picture and several non-anchor pictures, wherein a current picture is called an 'anchor picture' if all pictures that were previously encoded before this current picture precede it in display order, and a current picture is called a 'non-anchor picture' if there exists at least one previously encoded picture that follows the current picture in display order, and wherein adaptively, for the purpose of overall bit rate control, a specific picture target number of bits is assigned to these coding types, and wherein said overall bit rate control includes a picture-layer rate control and a macroblock-layer rate control which macroblock-layer rate control selects macroblock quantization parameters, said method comprising the steps:
assigning a target number of bits to anchor pictures but not assigning a target number of bits to non-anchor pictures;
coding the macroblocks of said anchor pictures using macroblock-layer rate control by adaptive macroblock quantization parameters, and coding the macroblocks of said non-anchor pictures without macroblock-layer rate control by using fixed macroblock quantization parameters.

2. Apparatus for digitally encoding a picture sequence, wherein the pictures of said picture sequence are arranged in macroblocks containing pixel blocks and the pictures are encoded in intra and predictive and/or bi-predictive coding types denoted I, P and B, respectively, and wherein said pictures form groups of pictures and each group includes one anchor picture and several non-anchor pictures, wherein a current picture is called an 'anchor picture' if all pictures that were previously encoded before this current picture precede it in display order, and a current picture is called a 'non-anchor picture' if there exists at least one previously encoded picture that follows the current picture in display order, and wherein adaptively, for the purpose of overall bit rate control, a specific picture target number of bits is assigned to these coding types, and wherein said overall bit rate control includes a picture-layer rate control and a macroblock-layer rate control which macroblock-layer rate control selects macroblock quantization parameters, said apparatus comprising:
means for assigning a target number of bits to anchor pictures but not assigning a target number of bits to non-anchor pictures;
means for coding the macroblocks of said anchor pictures using macroblock-layer rate control by adaptive macroblock quantization parameters, and for coding the macroblocks of said non-anchor pictures without macroblock-layer rate control by using fixed macroblock quantization parameters.

3. Method according to claim 1, wherein the quantization parameter used for the coding of non-anchor pictures in a current group of pictures is directly derived from the average quantization parameter of the previously encoded anchor picture belonging to that group.

4. Method according to claim 1, wherein for the bit rate control for the anchor and non-anchor pictures inside a current one of said groups a weighting factor $f_{Group-BP}$ or $f_{Group-I}$ is used, which weighting factors are adaptively controlled during the encoding of said picture sequence and specify the estimated ratios of the number $R_{NA}$ of bits used for encoding a non-anchor picture to the number $R_{A-BP}$ of bits required for encoding an anchor picture if it is coded as P or B picture, or $R_{A-I}$ if it is coded as I picture:

$$f_{Group-BP} = \frac{R_{NA}}{R_{A-BP}}, f_{Group-I} = \frac{R_{NA}}{R_{A-I}}.$$

5. Method according to claim 4, wherein for initialization at the beginning of encoding a picture sequence said weighting factors $f_{Group-BP}$ and $f_{Group-I}$ are set to:

$$f_{Group-BP} = \frac{1}{2}, f_{Group-I} = \frac{1}{10}.$$

6. Method according to claim 4, wherein based on a number $\hat{R}_{Group-BP}$ or $\hat{R}_{Group-I}$ of target bits for a current one of said groups, the picture target bit number $\hat{R}_{A-BP}$ or $\hat{R}_{A-I}$ for the anchor picture is:

$$\hat{R}_{A-BP} = \frac{\hat{R}_{Group-BP}}{(1+N_{NA} \cdot f_{Group-BP})} \text{ or } \hat{R}_{A-I} = \frac{\hat{R}_{Group-I}}{(1+N_{NA} \cdot f_{Group-I})},$$

respectively, wherein $N_{NA}$ denotes the number of non-anchor pictures inside that current group, and whereby a corresponding accurate macroblock-layer rate control is used.

7. Method according to claim 4, wherein the non-anchor picture or pictures of a current one of said groups are encoded using a fixed quantization step size of $Q_{NA} \approx 1.2 \cdot \overline{Q_A}$, where $\overline{Q_A}$ denotes the average quantization step size that was used for encoding the anchor picture of that group.

8. Method according to claim 4 wherein, after a current one of said groups has been encoded completely, said weighting factors $f_{Group-BP}$ and $f_{Group-I}$ are updated in that weighting factors for said current group are determined by $$\tilde{f}_{Group-BP}(n_{Group-BP}) = \frac{1}{N_{NA} \cdot R_{A-BP}} \cdot \sum_{k=1}^{N_{NA}} R_{NA}(k) \text{ or}$$

$$\tilde{f}_{Group-I}(n_{Group-I}) = \frac{1}{N_{NA} \cdot R_{A-I}} \cdot \sum_{k=1}^{N_{NA}} R_{NA}(k), \text{ respectively,}$$

wherein RNA(k) is the number of used bits for the k-th non-anchor picture inside said current group, RA-BP and RA-I are the number of bits used for encoding the anchor picture as P/B-picture or as I picture, respectively, and nGroup-BP and nGroup-I are continuously increasing indices for said weighting factors, and wherein the weighting factors to be used for following groups are each calculated as corresponding average values of the weighting factors used for several, e.g. five, of the last encoded groups.

9. Method according to claim 4 wherein, if Intra pictures are coded rarely, both said weighting factors $f_{Group-BP}$ and $f_{Group-I}$ are updated at the same time by using an adaptively controlled weighting factor $f_{BP-I}=R_{A-BP}/R_{A-I}$, which specifies the estimated bit rate ratio of anchor pictures coded as P/B pictures and anchor pictures coded as I pictures, such that $$f_{Group-I} = \frac{f_{Group-BP}}{f_{BP-I}}.$$

10. Method for digitally decoding an encoded picture sequence, wherein the pictures of said picture sequence are arranged in macroblocks containing pixel blocks and the pictures were encoded in intra and predictive and/or bi-predictive coding types denoted I, P and B, respectively, and wherein said pictures form groups of pictures and each group includes one anchor picture and several non-anchor pictures, wherein a current picture is called an 'anchor picture' if all pictures that were previously encoded before this current picture precede it in display order, and a current picture is called a 'non-anchor picture' if there exists at least one previously encoded picture that follows the current picture in display order, and wherein adaptively, for the purpose of overall bit rate control, a specific picture target number of bits was assigned to these coding types, and wherein said overall bit rate control included a picture-layer rate control and a macroblock-layer rate control which macroblock-layer rate control had selected macroblock quantization parameters, wherein a target number of bits was assigned to anchor pictures but was not assigned to non-anchor pictures, and wherein the macroblocks of said anchor pictures were coded using macroblock-layer rate control by adaptive macroblock quantization parameters, and the macroblocks of said non-anchor pictures were coded without macroblock-layer rate control by using fixed macroblock quantization parameters, said method including the step of:

decoding said anchor pictures using correspondingly adaptive macroblock quantization parameters, and decoding said non-anchor pictures using only fixed macroblock quantization parameters.

* * * * *